(12) United States Patent
Jaitly et al.

(10) Patent No.: US 11,080,599 B2
(45) Date of Patent: *Aug. 3, 2021

(54) VERY DEEP CONVOLUTIONAL NEURAL NETWORKS FOR END-TO-END SPEECH RECOGNITION

(71) Applicant: Google LLC, Mountain View, CA (US)

(72) Inventors: Navdeep Jaitly, Mountain View, CA (US); Yu Zhang, Mountain View, CA (US); William Chan, Markham (CA)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,538

(22) Filed: Nov. 22, 2019

(65) Prior Publication Data

US 2020/0090044 A1 Mar. 19, 2020

Related U.S. Application Data

(63) Continuation of application No. 16/380,101, filed on Apr. 10, 2019, now Pat. No. 10,510,004, which is a (Continued)

(51) Int. Cl.
*G06N 3/08* (2006.01)
*G10L 15/16* (2006.01)
(Continued)

(52) U.S. Cl.
CPC ............... *G06N 3/08* (2013.01); *G06N 3/04* (2013.01); *G06N 3/0445* (2013.01);
(Continued)

(58) Field of Classification Search
CPC ...... G06N 3/04; G06N 3/0445; G06N 3/0454; G06N 3/08; G10L 15/02; G10L 15/16; G10L 15/22
See application file for complete search history.

(56) References Cited

PUBLICATIONS

Sainath et al., "Learning the Speech Front-end With Raw Waveform CLDNNs", Sep. 6-10, 2015, 16th Annual Conference of the International Speech Communication Association, pp. 1-5 (Year: 2015).*
(Continued)

*Primary Examiner* — Kamran Afshar
*Assistant Examiner* — Brent Johnston Hoover
(74) *Attorney, Agent, or Firm* — Fish & Richardson P.C.

(57) ABSTRACT

A speech recognition neural network system includes an encoder neural network and a decoder neural network. The encoder neural network generates an encoded sequence from an input acoustic sequence that represents an utterance. The input acoustic sequence includes a respective acoustic feature representation at each of a plurality of input time steps, the encoded sequence includes a respective encoded representation at each of a plurality of time reduced time steps, and the number of time reduced time steps is less than the number of input time steps. The encoder neural network includes a time reduction subnetwork, a convolutional LSTM subnetwork, and a network in network subnetwork. The decoder neural network receives the encoded sequence and processes the encoded sequence to generate, for each position in an output sequence order, a set of sub string scores that includes a respective sub string score for each substring in a set of substrings.

20 Claims, 3 Drawing Sheets

Related U.S. Application Data continuation of application No. PCT/US2017/055891, filed on Oct. 10, 2017.

(60) Provisional application No. 62/406,345, filed on Oct. 10, 2016.

(51) Int. Cl.
  G06N 3/04 (2006.01)
  G10L 15/02 (2006.01)
  G10L 15/22 (2006.01)

(52) U.S. Cl.
  CPC ............ *G06N 3/0454* (2013.01); *G10L 15/02* (2013.01); *G10L 15/16* (2013.01); *G10L 15/22* (2013.01)

(56) References Cited

PUBLICATIONS

Abadi et al. "TensorFlow: Large-scale machine learning on heterogeneous systems," Preliminary White paper, Nov. 9, 2015 [retrieved on Apr. 18, 2019] Retrieved from Internet: URL<http://download.tensorflow.org/paper/whitepaper2015.pdf> 19 pages.
Abdel-Hamid et al. "Exploring convolutional neural network structures and optimization techniques for speech recognition," Interspeech, Aug. 2013, 5 pages.
Amodei et al. "Deep Speech 2: End-to-end speech recognition in English and Mandarin," International Conference on Machine Learning, Jun. 11, 2016, 10 pages.
Bandanau et al. "End-to-end Attention-based large vocabulary speech recognition," arXiv 1508.04395v2, Mar. 14, 2016, 8 pages.
Bandanau et al. "Neural Machine Translation by Jointly learning to align and translate," arXiv 1409.0473v7, May 19, 2016, 15 pages.
Bandanau et al. "Task Loss Estimation for Sequence Prediction," arXiv 1511.06456v4, Jan. 19, 2016, 13 pages.
Chan et al. "Deep convolutional neural networks for acoustic modeling in low resource languages," IEEE ICASSP, Apr. 19, 2015, 5 pages.
Chan et al. "On online attention-based speech recognition and joint mandarin character-pinyin training," Interspeech, Sep. 2016, 5 pages.
Chan et la. "Listen Attend and Spell: A Neural Network for Large Vocabulary Conversational Speech Recognition," IEEE ICASSP, Mar. 2016.
Chorowski et al. "Attention-Based Models for Speech Recognition," Advances in Neural Information Processing Systems, Jun. 2015, 9 pages.
Graves et al. "Hybrid Speech Recognition with Bidirectional LSTM," Automatic Speech Recognition and Understanding Workshop, Dec. 2013, 6 pages.
Graves et al. "Practical Variational inference for neural networks," NIPS, Dec. 2011, 9 pages.
Graves et al. "Towards end-to-end speech recognition with recurrent neural networks," International Conference on Machine Learning, Jan. 27, 2014, 9 pages.
Graves. "Sequence Transduction with Recurrent Neural Networks," arXiv 1211.3711v1, Nov. 14, 2012, 9 pages.
He et al. "Deep residual learning for image recognition," CVPR Jun. 2016, 9 pages.
Hihi et al. "Hierarchical recurrent neural networks for long-term dependencies," NIPS Dec. 1996, 7 pages.
Hinton et al. "Deep neural networks for acoustic modeling in speech recognition: the shared views of four research groups," IEEE Signal processing magazine, Nov. 2012, 16 pages.
Hochreiter et al. "Long Short-Term Memory," Neural computation vol. 9(8) Nov. 1997, 32 pages.
Ioffe et al. "Batch Normalization: Accelerating deep network training by reducing internal covariate shift," arXiv 1502.03167v3, Mar. 2, 2015, 11 pages.
Kalchbrenner et al. "Grid long short-term memory," arXiv 1507.01526v3, Jan. 7, 2016, 15 pages.
Kingma et al. "Adam: A method for stochastic optimization," arXiv 1412.6980v9, 15 pages.
LeCun et al. "Gradient-based learning applied to document recognition," Proceedings of the IEEE 86(11), Nov. 1998, 46 pages.
Lin et al. "Network in network," arXiv 1312.4400v3, Mar. 4, 2014, 10 pages.
PCT International Preliminary Report on Patentability issued in International Application No. PCT/US2017055891, completed on Sep. 21, 2018, 15 pages.
PCT Office; Notification of Transmittal of the International Search Report and Written Opinion mailed in corresponding Patent Application No. PCT/US2017/055891 (dated Jan. 26, 2018).
Rabiner. "A tutorial on hidden Markov models and selected application in speech recognition," Proceedings of the IEEE 77(2), Feb. 1989, 30 pages.
Sainath et al. "Deep convolutional neural networks for LVCSR," IEEE International Conference on Acoustics Speech and Signal Processing, May 2013, 5 pages.
Sainath et al. "Improvements to deep convolutional neural networks for LVCSR," arXiv 1309.1501v3, Dec. 10, 2013, 7 pages.
Sercu et al. "Advances in very deep convolutional neural networks for LVCSR," arXiv 1604.01792v2, Jun. 25, 2016, 5 pages.
Sercu et al. "Very deep multilingual convolutional neural networks for LVCSR," arXiv 1509.08967v2, Jan. 23, 2016, 5 pages.
Shi et al. "Convolutional LSTM network: a machine learning approach for precipitation nowcasting," NIPS, Dec. 2015, 9 pages.
Simonyan et al. "Very deep convolutional networks for large-scale image recognition," arXiv 1409.1556v6, Apr. 10, 2015, 14 pages.
Srivastava et al. "Training very deep networks," NIPS Dec. 2015, 9 pages.
Szegedy et al. "Going deeper with convolutions," IEEE Conference on CVPR, Jun. 2015, 9 pages.
Tara N. Sainath et al. "Learning the Speech Front-end with Raw Waveform CLDNNs," Proceedings Interspeech 2015, Dresden, Germany, Sep. 6, 2015 (Sep. 6, 2015), pp. 1-5.
Zhang et al. "Highway long short-term memory RNNs for distant speech recognition," arXiv 1510.08983v2, Jan. 11, 2016, 5 pages.

\* cited by examiner

VERY DEEP CONVOLUTIONAL NEURAL NETWORKS FOR END-TO-END SPEECH RECOGNITION

CROSS-REFERENCE TO RELATED APPLICATION

This application is a continuation of U.S. application Ser. No. 16/380,101 filed on Apr. 10, 2019, which claims the benefit of International Application No. PCT/US2017/055891 filed on Oct. 10, 2017, which claims priority to U.S. Provisional Application Ser. No. 62/406,345, filed on Oct. 10, 2016. The disclosures of these prior applications are considered part of and are incorporated by reference in the disclosure of this application.

BACKGROUND

This specification relates to speech recognition using neural networks.

Speech recognition systems receive an acoustic sequence and generate a transcription of an utterance represented by the acoustic sequence. Some speech recognition systems include a pronunciation system, an acoustic modeling system and a language model. The acoustic modeling system generates a phoneme representation of the acoustic sequence, the pronunciation system generates a grapheme representation of the acoustic sequence from the phoneme representation, and the language model generates the transcription of the utterance that is represented by the acoustic sequence from the grapheme representation.

SUMMARY

This specification describes a speech recognition system implemented as computer programs on one or more computers in one or more locations.

The speech recognition includes an encoder neural network configured to generate an encoded sequence from an input acoustic sequence. The input acoustic sequence represents an utterance. The input acoustic sequence includes a respective acoustic feature representation at each of a plurality of input time steps. The encoded sequence includes a respective encoded representation at each of a plurality of time reduced time steps. The number of time reduced time steps is less than the number of input time steps.

The encoder neural network includes a time reduction subnetwork configured to process the input acoustic sequence to generate a sequence of reduced representations including a respective reduced representation at each of the plurality of time reduced time steps. The encoder neural network also includes a convolutional LSTM subnetwork configured to, for each time reduced time step, process the reduced representation at the time reduced time step to generate a convolutional LSTM output for the time step. The encoder neural network further includes a network in network subnetwork configured to, for each time reduced time step, process the convolutional LSTM output at the time reduced time step to generate the encoded representation for the time reduced time step.

The speech recognition system further includes a decoder neural network configured to receive the encoded sequence and process the encoded sequence to generate, for each position in an output sequence order, a set of sub string scores that includes a respective substring score for each substring in a set of substrings.

Particular embodiments of the subject matter described in this specification can be implemented so as to realize one or more of the following advantages. By generating an encoded representation of a received acoustic sequence using the encoder neural network as described in this specification, the performance of a speech recognition neural network that includes the encoder neural network can be improved. In particular, the encoder neural network as described in this specification adds depth of processing using more non-linearities and expressive power, while keeping the number of parameters of the encoder neural network manageable, in effect increasing the amount of computation per parameter. That is, the encoder neural network adds depth of processing in an effective manner to both result in improved performance and maintain a reasonable computational footprint, i.e., without requiring excessive processing resources and memory to store the speech recognition neural network or to recognize input speech using the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
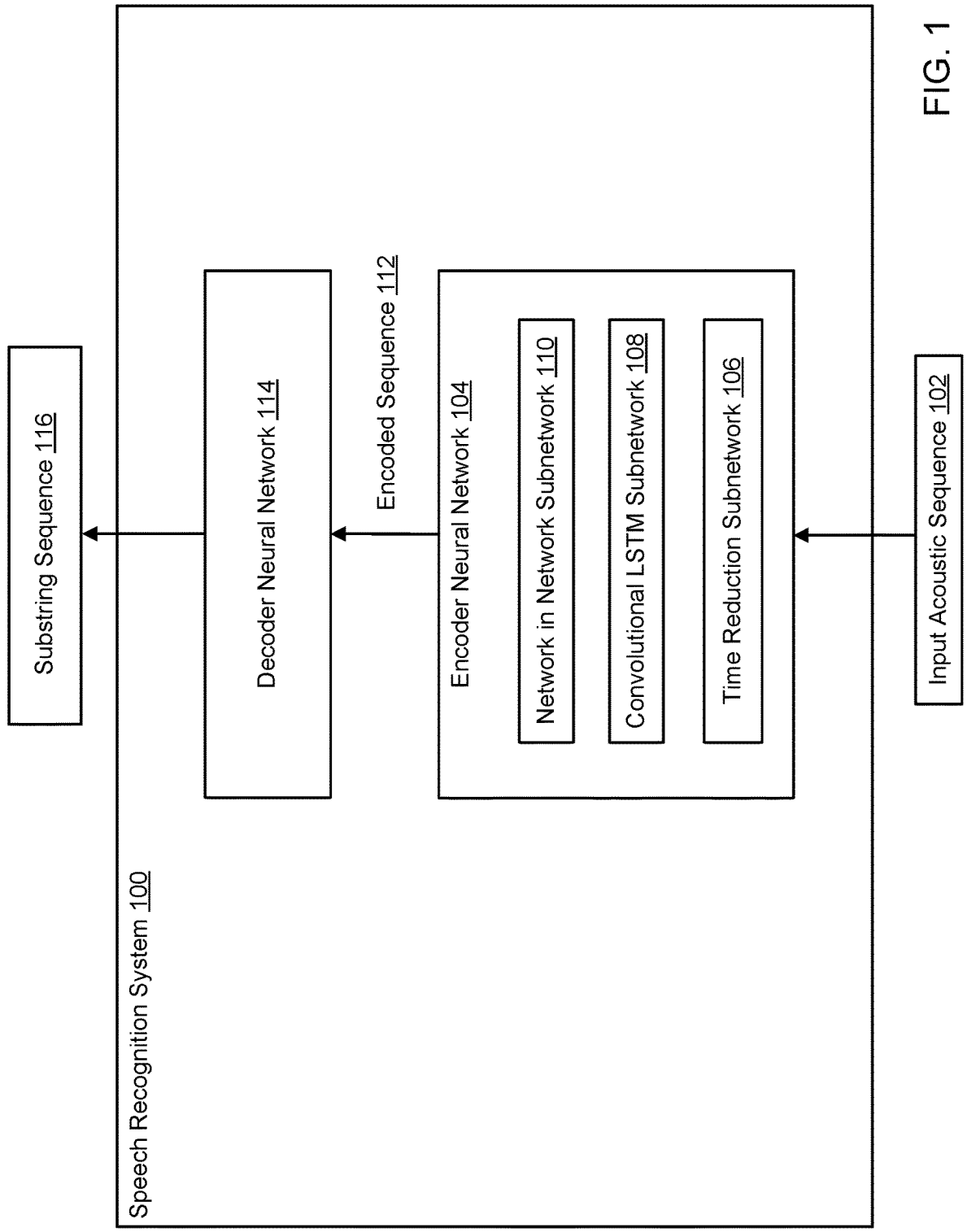
FIG. 1 shows an example speech recognition system.

FIG. 1 illustrates an example speech recognition system 100. The speech recognition system 100 is an example of a system implemented as computer programs on one or more computers in one or more locations, in which the systems, components, and techniques described below can be implemented.

The speech recognition system 100 obtains input acoustic sequences and processes the input acoustic sequences to generate substring sequences. Each substring sequence is a transcription of the utterance represented by the corresponding input acoustic sequence. For example, the speech recognition system 100 can obtain an input acoustic sequence 102 and generate a corresponding substring sequence 116 that is a transcription of the utterance represented by the input acoustic sequence 102.

The input acoustic sequence 102 may include a sequence of multiple frames of audio data that is a digital representation of an utterance, e.g., a continuous stream of data. The sequence of multiple frames of audio data may correspond to a first set of time steps, e.g., where each frame of audio data is associated with 10 milliseconds of audio stream data. Each frame of audio data in the sequence of multiple frames of audio data may include feature values for the frame that characterizes the utterance at the corresponding time step.

The substring sequence 116 may include a sequence of substrings that are a transcription of the utterance represented by the input acoustic sequence 102. A substring may include one or more characters. For example, the set of sub strings may be a character set which includes an alphabet of alphabetic letters. The alphabet is a standard set of alphabetic letters which is used to write one or more natural languages, generally because the alphabetic letters represent phonemes in the spoken natural language. For example, the alphabet may be the English alphabet. The character set may also include Arabic numerals, a space character, a comma character, a period character, an apostrophe character, and an unknown character. In another example, the set of substrings may include word pieces, i.e., partial words, words, or both.

To generate a substring sequence for an input acoustic sequence, the speech recognition system 100 implements an attention-based sequence to sequence (seq2seq) model that has been trained to transcribe an input acoustic sequence to a substring sequence. For example, assuming that the input acoustic sequence 102 of audio frames is denoted as $x=(x_1, \ldots, x_T)$, and the output substring sequence 116 of substrings is denoted as $y=(y_1, \ldots, y_S)$, then the model determines each substring in the output substring sequence $y_i$ using a conditional distribution over the previously generated substrings y<i and the input sequence x. The probability of the entire output substring sequence is computed using the chain rule of probabilities:

$$P(y \mid x) = \prod_i P(y_i \mid x, y < i). \quad (1)$$

The model includes two sub-modules an acoustic model encoder, e.g. the encoder neural network 104, and an attention-based character decoder, e.g., the decoder neural network 114.

The encoder neural network 104 is configured to process the input acoustic sequence 102 and to generate an alternative representation for the input acoustic sequence 102. The alternative representation may include an encoded sequence 112 of multiple frames of audio data that correspond to a second set of time steps. In some implementations, the encoded sequence 112 is a high level representation of the input acoustic sequence 102, i.e., the second set of time steps in the encoded sequence 112 is smaller than the first set of time steps in the input acoustic sequence 102. That is, the encoder neural network 104 can transform the original input sequence x into a high level representation:

$$h=(h_1, \ldots, h_U) \text{ with } U \leq T. \quad (2)$$

To generate the high level representation of the input acoustic sequence 102, the encoder neural network 104 includes a time reduction subnetwork 106, a convolutional long short-term memory (LSTM) subnetwork 108, and a network-in-network subnetwork 110. The NiN subnetwork 110 generally includes multiple bidirectional LSTM neural network layers. A BLSTM neural network layer is a neural network layer that has one or more LSTM memory blocks and that predicts or labels each element of a sequence based on both the past and the future context of the element. An example BLSTM neural network that can be used to process acoustic sequences is described in more detail in "*Hybrid Speech Recognition with Bidirectional LSTM,*" Alex Graves, Navdeep Jaitly, and Abdel-rahman Mohamed, Automatic Speech Recognition and Understanding Workshop, 2013. The time reduction subnetwork 106 includes multiple residual blocks with each block including a convolutional neural network layer and a convolutional LSTM neural network layer separated by at least a batch normalization layer. The time reduction subnetwork 106 includes multiple time reduction blocks with each block including a depth concatenation layer and time-reduction convolutional layer.

The architecture of the encoder neural network 104 is described in more detail with reference to FIG. 2.

After the encoder neural network 104 has generated the encoded sequence 112, the decoder neural network 114 is configured to process the encoded sequence 112 and generates a substring sequence 116 from the encoded sequence 112. In particular, the decoder neural network 114 is configured to generate, for each position in an output sequence order, a set of substring scores that includes a respective substring score for each substring in the substring sequence 116. A respective substring score for each substring defines a likelihood that the substring represents the correct transcription of the utterance represented by the input acoustic sequence 102.

The decoder neural network 114 is then configured to generate the sequence 116 of substrings from the set of substring scores. The substring sequence 116 represents the transcription of the utterance represented by the input acoustic sequence 102.

In some implementations, the decoder neural network 114 is an attention-based recurrent neural network. Examples of the decoder neural network 114 and example techniques for generating transcriptions of utterances using the substring scores generated by the decoder neural network 114 are described in more detail in W. Chan, N. Jaitly, Q. Le, and O. Vinyals, "*Listen, Attend and Spell: A Neural Network for Large Vocabulary Conversational Speech Recognition,*" in International Conference on Acoustics, Speech, and Signal Processing, 2016.

Figure 2:
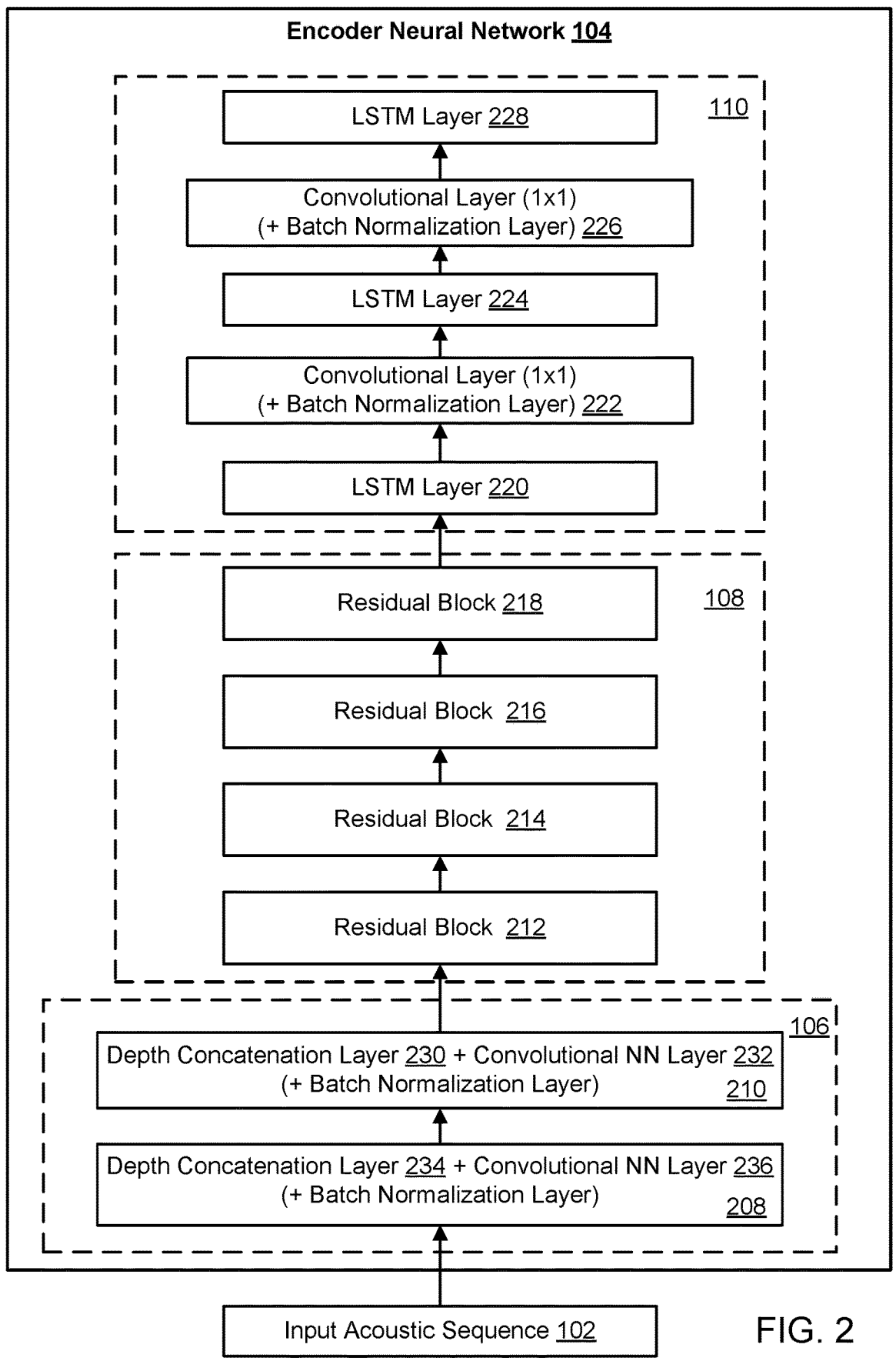
FIG. 2 shows an example architecture of an encoder neural network.

FIG. 2 shows an example architecture of an encoder neural network of a speech recognition system, for example, the encoder neural network of 104 of the speech recognition system 100 of FIG. 1.

The encoder neural network 104 includes a time reduction subnetwork 106, a convolutional LSTM subnetwork 108, and a network-in-network subnetwork 110.

The time reduction subnetwork 106 includes multiple time-reduction blocks, e.g., the first time-reduction block 208 and the second time-reduction block 210. The time reduction subnetwork 106 is configured to receive and to process the input acoustic sequence 102 through the time-reduction blocks 208 and 210. The input acoustic sequence 102 may include a sequence of multiple frames of audio data that is a digital representation of an utterance, e.g., a continuous stream of data. The sequence of multiple frames of audio data may correspond to a first set of time steps, e.g., where each frame of audio data is associated with 10 milliseconds of audio stream data. Each time-reduction block includes a depth concatenation layer and a time-reduction convolutional layer. For example, the time-reduction block 208 includes a depth concatenation layer 230 and a time-reduction convolutional layer 232. The time-reduction block 208 includes a depth concatenation layer 234 and a time-reduction convolutional layer 236.

Since seq2seq models may need to handle very long input acoustic sequence (i.e., >2000 frames), if a convolutional neural network (CNN) layer is simply stacked before Bidirectional Long-Short Term Memory (BLSTM) neural network layers (e.g., the BLSTM layers in the network-in-network subnetwork 110 as described below), the system may quickly run out of GPU memory for deep models and may also have excessive computation times. To alleviate this problem, the time reduction subnetwork 106 is configured to apply concatenation and striding in each time-reduction block to reduce the time dimensionality and memory footprint. The time reduction subnetwork 106 is configured to process the input acoustic sequence 102 through the time-reduction blocks to generate a reduced sequence that includes a respective reduced representation at each time-reduced time step in a set of time-reduced time steps, with the number of time-reduced time steps in the second set being less than the number of time steps in the first set of time steps of the input acoustic sequence 102.

In particular, the depth concatenation layer 234 in the block 208 is configured to depth concatenate acoustic feature representations at multiple adjacent input time steps at predetermined intervals in the input acoustic sequence to generate a first sequence of concatenated representations. For example, assuming the input time steps are $\{t_1, t_2, t_3, \ldots, t_n\}$, the depth concatenation layer 234 may depth concatenate the acoustic feature representations at multiple adjacent time steps, e.g., three time steps $t_1$, $t_2$, and $t_3$, to generate the first concatenated representation for a first initial time-reduced time step $t_{1-3}$. The depth concatenation layer 234 then moves forward by a number of time steps determined by the stride of the convolutional NN layer 236, e.g. k time steps if the layer 236 has stride k, and continues concatenating the same number of times steps. For example, the layer 234 is configured to move forward by two time steps and concatenate the next three time steps $t_3$, $t_4$, and $t_5$ to generate a second concatenated representation for a second initial time-reduced time step $t_{3-5}$. The layer 234 repeats the above process until reaching the last input time steps in order to generate the first sequence of concatenated representations of the input acoustic sequence for the initial time-reduced time steps. As a result, the number of initial time-reduced time steps has been reduced to half of the number of time steps in the set of input time steps.

The time-reduction convolutional layer 236 is then configured to process the first sequence of concatenated representations to generate a sequence of initial reduced representations including a respective initial reduced representation at each of a plurality of initial time-reduced time steps.

The depth concatenation layer 230 in the time-reduction block 210 is configured to depth concatenate the initial reduced representations at multiple adjacent initial time-reduced time steps at predetermined intervals in the initial reduced sequence to generate a second sequence of concatenated representations. For example, the layer 230 is configured to concatenate the initial reduced representations at three initial time-reduced time steps $t_{1-3}$, $t_{3-5}$, and $t_{5-7}$. The layer 230 is then configured to move by two initial time-reduced time steps (i.e. assuming the time-reduction convolutional layer 232 has stride 2) and to concatenate the next three initial time-reduced time steps $t_{5-7}$, $t_{7-9}$, and $t_{9-11}$. The layer 230 repeats the above process until reaching the last initial time-reduced time step in order to generate a second sequence of concatenated representations of the input acoustic sequence.

The time-reduction convolutional layer 232 is then configured to process the second sequence of concatenated representations to generate the sequence of reduced representations comprising a reduced representation at each of the plurality of time reduced time steps. By processing the input acoustic sequence through the time-reduction blocks 208 and 210 as described in the above example, the number of time steps in the output of the time reduction subnetwork 106, e.g., the sequence of reduced representations, has been reduced by 4 times the number of input time steps of the original input acoustic sequence.

In some implementations, each time-reduction convolutional layer in each time-reduction block in the subnetwork 106 is followed by a batch normalization layer that normalizes each layer's inputs to reduce internal covariate shift. Batch normalization layers enable higher learning rates and robust initialization as well as improving generalization by making normalization a part of a model architecture and performing the normalization for each training mini-batch of training data. Batch normalization is particularly useful for training seq-2-seq models, which have high variance in the gradient (especially from random initialization). Bath normalization is described in detail in S. Ioffe and C. Szegedy, "*Batch normalization: Accelerating deep network training by reducing internal covariate shift.*" In Proceedings of The 32nd International Conference on Machine Learning, pages 448-456, 2015.

The convolutional LSTM subnetwork 108 includes multiple residual blocks (e.g., four residual blocks 212-218). Each residual block includes a convolutional layer and a convolutional LSTM neural network layer (e.g., a 3×3 convolutional LSTM filter) separated by at least a batch normalization layer. The convolutional layer may precede the convolutional LSTM layer in each block, or vice versa. A convolutional LSTM neural network layer uses a convolution to replace the inner product within the LSTM unit. The convolutional LSTM neural network layer in each residual block can be a bidirectional convolutional LSTM layer. Each residual block includes a skip connection from an input to the residual block to an output of the convolutional LSTM neural network layer in the residual block.

After the time reduction subnetwork 106 has generated a reduced sequence that includes a respective reduced representation at each time reduced time step in the second set of time steps, the convolutional LSTM subnetwork 108 is configured to, for each time reduced time step, collectively process the reduced representation at the time reduced time step through the residual blocks to generate a convolutional LSTM output for the time reduced time step.

The network-in-network (NiN) subnetwork 110 generally includes multiple bidirectional LSTM neural network layer (e.g., bidirectional LSTM neural network layers 220, 224, and 228). The NiN subnetwork 110 further includes a respective 1×1 convolutional layer in between each pair of bidirectional LSTM neural network layers to increase the network depth. For example, the NiN subnetwork 110 includes 1×1 convolutional layer 222 between bidirectional LSTM layer 220 and bidirectional LSTM layer 224, and 1×1 convolutional layer 226 between bidirectional LSTM layer 224 and bidirectional LSTM layer 228. Each 1×1 convolutional layer is followed by a respective batch normalization layer. The use of 1×1 convolutional layers increases the depth and expressive power of the encoder neural network 104 while reducing the total number of parameters that would have been needed otherwise to build such deep networks.

The NiN subnetwork 110 is configured to, for each time reduced time step in the second set of time steps, collectively process the convolutional LSTM output generated by the convolutional LSTM subnetwork 108 at the time reduced time step to generate the encoded representation for the time reduced time step.

The above-described encoder neural network 104 adds depth of processing using more non-linearities and expressive power, while keeping the number of parameters of the encoder neural network manageable, in effect increasing the amount of computation per parameter. That is, the encoder neural network adds depth of processing in an effective manner to both result in improved performance and maintain a reasonable computational footprint, i.e., without requiring excessive processing resources and memory to store the speech recognition neural network or to recognize input speech using the neural network. These advantages are realized by, for example, using a combination of skip connections and batch normalization, which allows the encoder neural network to be constructed and efficiently trained without suffering from poor optimization or generalization which may happen when the network 104 is trapped at a local minima. In addition, the use of convolutional LSTM neural network layers, which include convolutions that capture spectral structure and provide shared weight filters, allows the encoder neural network to maintain structural representations and to add more computation power while reducing the number of parameters for better generalization.

Figure 3:
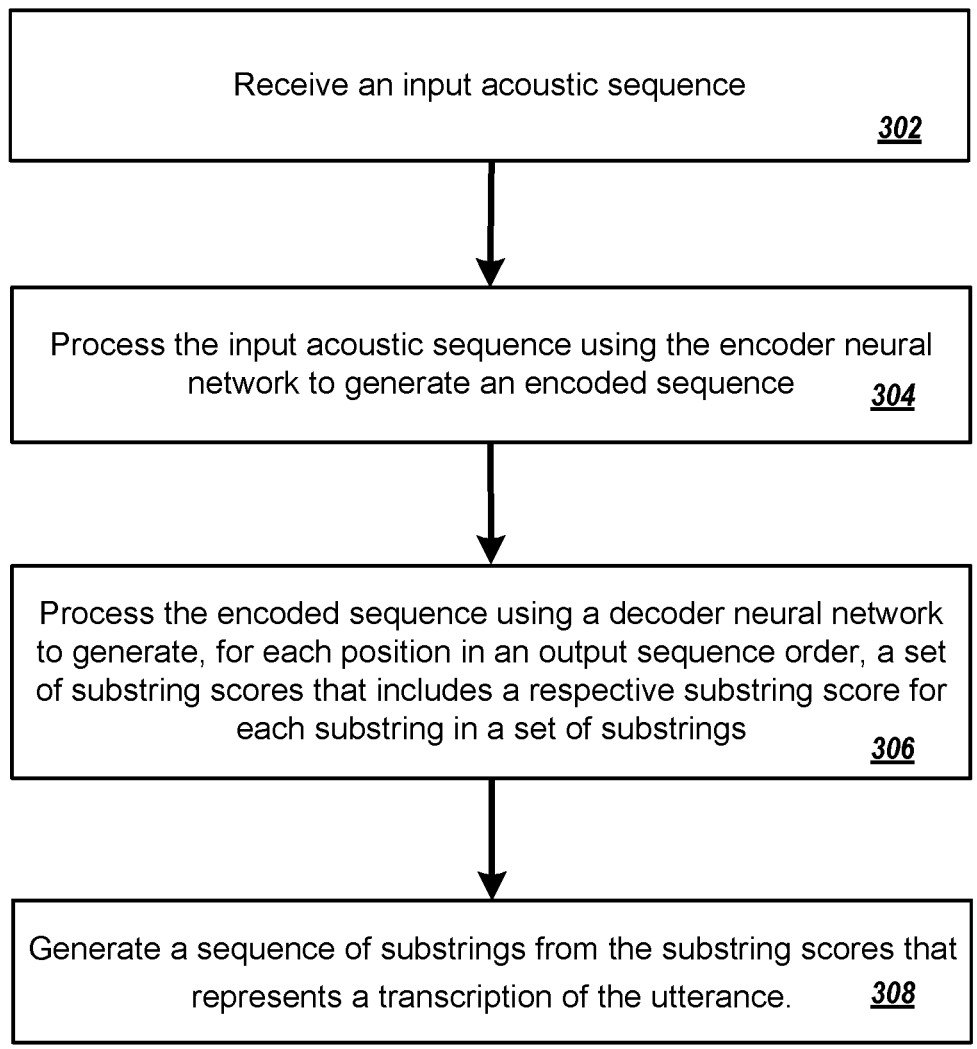
FIG. 3 is a flow diagram of an example process for generating a substring sequence representing a transcription of an utterance represented by an input acoustic sequence.

FIG. 3 is a flow diagram of an example process 300 for generating a transcription of an utterance represented by an acoustic sequence. For convenience, the process 300 will be described as being performed by a system of one or more computers located in one or more locations. For example, a speech recognition system (e.g., the speech recognition system 100 of FIG. 1), appropriately programmed, can perform the process 300.

The system receives an input acoustic sequence (step 302). The acoustic sequence represents an utterance and includes a respective frame of audio data for each of a first set of time steps. Each frame of data is an acoustic feature representation of the utterance at the corresponding time step.

The system processes the input acoustic sequence to generate an encoded sequence for the input acoustic sequence (step 304). The encoded sequence is a sequence of multiple frames of audio data that correspond to a second set of time steps. In some implementations, the encoded sequence is a high level representation of the input acoustic sequence, i.e., the second set of time steps in the encoded sequence is smaller than the first set of time steps in the input acoustic sequence. The system processes the input acoustic sequence using an encoder neural network, for example, the encoder neural network of FIG. 1 and FIG. 2, that includes a time reduction subnetwork, a convolutional LSTM subnetwork, and a network in network subnetwork.

In particular, the system processes the input acoustic sequence, using the time reduction subnetwork, to generate a sequence of reduced representations including a respective reduced representation at each time reduced time step of the second set of time steps. For each time reduced time step, the system processes, using the convolutional LSTM subnetwork, the reduced representation at the time reduced time step to generate a convolutional LSTM output for the time step. The system then, for each time reduced time step, processes the convolutional LSTM output at the time reduced time step to generate the encoded representation for the time reduced time step. The encoded sequence includes encoded representations generated by the system for all time reduced time steps in the second set of time steps.

The system processes the encoded sequence to generate, for each position in an output sequence order, a set of sub string scores that includes a respective sub string score for each substring in a set of substrings (step 306). In some implementations a substring may include one or more characters. For example, the system may process the encoded sequence for the input acoustic sequence using an attention-based character decoder, e.g., the decoder neural network 114 of FIG. 1, to generate, for each position in an output sequence order, a set of substring scores that includes a respective substring score for each substring in a set of substrings. The set of sub strings may include a set of alphabetic letters which may be used to write one or more natural languages, e.g., the English alphabet and Arabic numerals {a, b, c, z, . . . , 0, . . . , 9}. The set of substrings may also include a space character, a comma character, a period character, an apostrophe character, and an unknown character. In some cases, the set of sub strings may include word pieces, i.e., partial words, words, or both. A respective substring score for each substring defines a likelihood that the sub string represents the correct transcription of the utterance represented by the input acoustic sequence.

The system generates a sequence of sub strings from the substring scores that represents a transcription of the utterance (step 308). Example techniques for generating transcriptions of utterances using the scores generated by the decoder neural network are described in more detail in W. Chan, N. Jaitly, Q. Le, and O. Vinyals, "*Listen, Attend and Spell: A Neural Network for Large Vocabulary Conversational Speech Recognition,*" in International Conference on Acoustics, Speech, and Signal Processing, 2016.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A speech recognition neural network system implemented by one or more computers, comprising:
   an encoder neural network configured to generate an encoded sequence from an input acoustic sequence,
   the input acoustic sequence representing an utterance,
   the input acoustic sequence comprising a respective acoustic feature representation at each of a plurality of input time steps,
   the encoded sequence comprising a respective encoded representation at each of a plurality of time reduced time steps,
   the number of time reduced time steps being less than the number of input time steps, and
   the encoder neural network comprising:
      a time reduction subnetwork configured to process the input acoustic sequence to generate a sequence of reduced representations comprising a respective reduced representation at each of the plurality of time reduced time steps;
      a convolutional Long short-term memory (LSTM) subnetwork configured to, for each time reduced time step, process the reduced representation at the time reduced time step to generate a convolutional LSTM output for the time step; and
      a network in network subnetwork configured to, for each time reduced time step, process the convolutional LSTM output at the time reduced time step to generate the encoded representation for the time reduced time step; and
   a decoder neural network configured to receive the encoded sequence and process the encoded sequence to generate, for each position in an output sequence order, a set of sub string scores that includes a respective substring score for each substring in a set of substrings.

2. The system of claim 1, wherein the convolutional LSTM subnetwork comprises a plurality of residual blocks stacked one after the other, and
   wherein each residual block comprises:
   a convolutional neural network layer and a convolutional LSTM neural network layer separated by at least a batch normalization layer.

3. The system of claim 2, wherein each residual block further comprises:
   a skip connection from an input to the residual block to an output of the convolutional LSTM neural network layer.

4. The system of claim 1, wherein the network in network subnetwork comprises a plurality of LSTM layers.

5. The system of claim 4, wherein the network in network subnetwork comprises a respective convolutional layer that uses a 1×1 dimensional filter in between each pair of LSTM layers.

6. The system of claim 4, wherein each convolutional layer that uses a 1×1 dimensional filter is followed by a respective batch normalization layer.

7. The system of claim 1, further comprising:
   a decoder subsystem configured to generate a sequence of substrings from the substring scores that represents a transcription of the utterance.

8. The system of claim 1, wherein the time reduction subnetwork comprises:
   a first time reduction block comprising:
      a first depth concatenation layer configured to depth concatenate acoustic feature representations at multiple adjacent input time steps at predetermined intervals in the input acoustic sequence to generate a first sequence of concatenated representations; and
      a first time-reduction convolutional layer configured to process the first sequence of concatenated representations to generate a sequence of initial reduced representations comprising a respective initial reduced representation at each of a plurality of initial time reduced time steps; and
   a second time reduction block comprising:
      a second depth concatenation layer configured to depth concatenate initial reduced representations at multiple adjacent initial time reduced time steps at predetermined intervals in the initial reduced sequence to generate a second sequence of concatenated representations; and
      a second time-reduction convolutional layer configured to process the second sequence of concatenated representations to generate the sequence of reduced representations comprising a reduced representation at each of the plurality of time reduced time steps.

9. A method comprising:
   receiving an input acoustic sequence representing an utterance, the input acoustic sequence comprising a respective acoustic feature representation at each of a plurality of input time steps; and
   processing the input acoustic sequence using an encoder neural network to generate an encoded sequence comprising a respective encoded representation at each of a plurality of time reduced time steps, the number of time reduced time steps being less than the number of input time steps,
   wherein processing the input acoustic sequence using the encoder neural network comprises:
      processing, using a time reduction subnetwork of the encoder neural network, the input acoustic sequence to generate a sequence of reduced representations comprising a respective reduced representation at each of the plurality of time reduced time steps;
      for each time reduced time step, processing, using a convolutional Long short-term memory (LSTM) subnetwork of the encoder neural network, the reduced representation at the time reduced time step to generate a convolutional LSTM output for the time step; and
      for each time reduced time step, processing, using a network in network subnetwork of the encoder neural network, the convolutional LSTM output at the time reduced time step to generate the encoded representation for the time reduced time step; and processing, using a decoder neural network, the encoded sequence to generate, for each position in an output sequence order, a set of sub string scores that includes a respective sub string score for each sub string in a set of sub strings.

10. The method of claim 9, further comprising:
generating a sequence of substrings from the sub string scores that represents a transcription of the utterance.

11. The method of claim 9, wherein processing, using the time reduction subnetwork of the encoder neural network, the input acoustic sequence to generate the sequence of reduced representations comprising a respective reduced representation at each of the plurality of time reduced time steps comprises:
depth concatenating acoustic feature representations at multiple adjacent input time steps at predetermined intervals in the input acoustic sequence to generate a first sequence of concatenated representations;
processing the first sequence of concatenated representations to generate a sequence of initial reduced representations comprising a respective initial reduced representation at each of a plurality of initial time reduced time steps;
depth concatenating initial reduced representations at multiple adjacent initial time reduced time steps at predetermined intervals in the initial reduced sequence to generate a second sequence of concatenated representations; and
processing the second sequence of concatenated representations to generate the sequence of reduced representations comprising a reduced representation at each of the plurality of time reduced time steps.

12. The method of claim 9, wherein a respective sub string score for each substring defines a likelihood that the sub string represents a correct transcription of the utterance represented by the input acoustic sequence.

13. The method of claim 9, wherein the set of sub strings includes a set of alphabetic letters corresponding to one or more natural languages.

14. The method of claim 9, wherein the set of sub strings includes one or more of a space character, a comma character, a period character, or an apostrophe character.

15. The method of claim 9, wherein the set of sub strings includes word pieces.

16. The method of claim 9, wherein the convolutional LSTM subnetwork comprises a plurality of residual blocks stacked one after the other, and
wherein each residual block comprises:
a convolutional neural network layer and a convolutional LSTM neural network layer separated by at least a batch normalization layer.

17. The method of claim 16, wherein each residual block further comprises:
a skip connection from an input to the residual block to an output of the convolutional LSTM neural network layer.

18. The method of claim 9, wherein the network in network subnetwork comprises a plurality of LSTM layers.

19. One or more non-transitory computer storage media storing instructions that, when executed by one or more computers, cause the one or more computers to perform operations comprising:
receiving an input acoustic sequence representing an utterance, the input acoustic sequence comprising a respective acoustic feature representation at each of a plurality of input time steps; and
processing the input acoustic sequence using an encoder neural network to generate an encoded sequence comprising a respective encoded representation at each of a plurality of time reduced time steps, the number of time reduced time steps being less than the number of input time steps,
wherein processing the input acoustic sequence using the encoder neural network comprises:
processing, using a time reduction subnetwork of the encoder neural network, the input acoustic sequence to generate a sequence of reduced representations comprising a respective reduced representation at each of the plurality of time reduced time steps;
for each time reduced time step, processing, using a convolutional Long short-term memory (LSTM) subnetwork of the encoder neural network, the reduced representation at the time reduced time step to generate a convolutional LSTM output for the time step; and
for each time reduced time step, processing, using a network in network subnetwork of the encoder neural network, the convolutional LSTM output at the time reduced time step to generate the encoded representation for the time reduced time step; and
processing, using a decoder neural network, the encoded sequence to generate, for each position in an output sequence order, a set of sub string scores that includes a respective sub string score for each sub string in a set of sub strings,
wherein the network in network subnetwork comprises a plurality of bi-directional LSTM layers.

20. The one or more non-transitory computer storage media of claim 19, wherein the operations further comprise:
generating a sequence of substrings from the sub string scores that represents a transcription of the utterance.

* * * * *